US008930945B2

(12) United States Patent
Boogert et al.

(10) Patent No.: US 8,930,945 B2
(45) Date of Patent: Jan. 6, 2015

(54) ENVIRONMENT MANAGERS VIA VIRTUAL MACHINES

(75) Inventors: Kevin M. Boogert, Sandy, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1550 days.

(21) Appl. No.: 11/940,528

(22) Filed: Nov. 15, 2007

(65) Prior Publication Data

US 2009/0133017 A1 May 21, 2009

(51) Int. Cl.
*G06F 9/44* (2006.01)
*G06F 9/455* (2006.01)
*G06F 9/46* (2006.01)
*G06F 21/62* (2013.01)

(52) U.S. Cl.
CPC .................................. *G06F 21/629* (2013.01)
USPC ............... 718/1; 718/100; 718/101; 718/102; 717/120; 717/121

(58) Field of Classification Search
None
See application file for complete search history.

(56) References Cited

U.S. PATENT DOCUMENTS

| | | | |
|---|---|---|---|
| 2002/0174306 | A1 | 11/2002 | Gajjar et al. |
| 2003/0169695 | A1 | 9/2003 | Salo et al. |
| 2004/0113950 | A1 | 6/2004 | Brockway et al. |
| 2004/0225952 | A1 | 11/2004 | Brown et al. |
| 2005/0021698 | A1 | 1/2005 | Devarakonda et al. |
| 2005/0027754 | A1 | 2/2005 | Gajjar et al. |
| 2005/0120160 | A1 | 6/2005 | Plouffe et al. |
| 2005/0149372 | A1 | 7/2005 | Kite et al. |
| 2006/0136912 | A1 | 6/2006 | Robinson et al. |
| 2006/0179061 | A1 | 8/2006 | D'Souza et al. |
| 2006/0184937 | A1 | 8/2006 | Abels et al. |
| 2006/0200477 | A1 | 9/2006 | Barrenechea |
| 2006/0259594 | A1 | 11/2006 | Paliwal et al. |
| 2007/0027973 | A1 | 2/2007 | Stein et al. |
| 2007/0028244 | A1 | 2/2007 | Landis et al. |
| 2007/0043860 | A1 | 2/2007 | Pabari |
| 2007/0067435 | A1 | 3/2007 | Landis et al. |

(Continued)

FOREIGN PATENT DOCUMENTS

WO    WO 2008054997 A2 *  5/2008  ............... G06F 9/455

OTHER PUBLICATIONS

Steve Tally, "'Not So Fast Supercomputers,' Say Computer Programmers," Grid Today, www.gridtoday.com/grid/1580796, May 30, 2007, 4 pps.

(Continued)

*Primary Examiner* — Emerson Puente
*Assistant Examiner* — Jonathan R Labud
(74) *Attorney, Agent, or Firm* — King & Schickli, PLLC

(57) ABSTRACT

Methods and apparatus enforce computing policies of an enterprise in a distributed manner so that idiosyncratic services to a computing device can be minimized or altogether eliminated. Pluralities of virtual machines are arranged on one or more computing devices and define, for example, applications specified by a user and shared services approved by the enterprise. A central library stores the virtual machines and each is available for check-out by users. A manager evaluates the virtual machines for satisfactory compliance with the computing policies at a time when the virtual machines are resident in the library. Upon confirmation of satisfactory compliance, the applications and shared services are available for deployment to users. Otherwise, the virtual machines are centrally serviced for compliance and/or tested before redeployment. Libraries, managers, software program products, threat assessment, and policy management are other features, to name a few.

21 Claims, 3 Drawing Sheets

(56) References Cited

U.S. PATENT DOCUMENTS

| | | |
|---|---|---|
| 2007/0089111 A1 | 4/2007 | Robinson et al. |
| 2007/0106993 A1 | 5/2007 | Largman et al. |
| 2007/0180450 A1* | 8/2007 | Croft et al. ............ 718/1 |
| 2007/0266433 A1* | 11/2007 | Moore ............... 726/15 |
| 2008/0235361 A1* | 9/2008 | Crosbie et al. .......... 709/223 |
| 2009/0006537 A1* | 1/2009 | Palekar et al. .......... 709/203 |
| 2009/0007105 A1* | 1/2009 | Fries et al. ............ 718/1 |

OTHER PUBLICATIONS

Kate Greene, "The Trouble with Multi-Core Computers," Technology Review, www.technologyreview.com/Infotech/17682, Nov. 1, 2006, 4 pps.

* cited by examiner

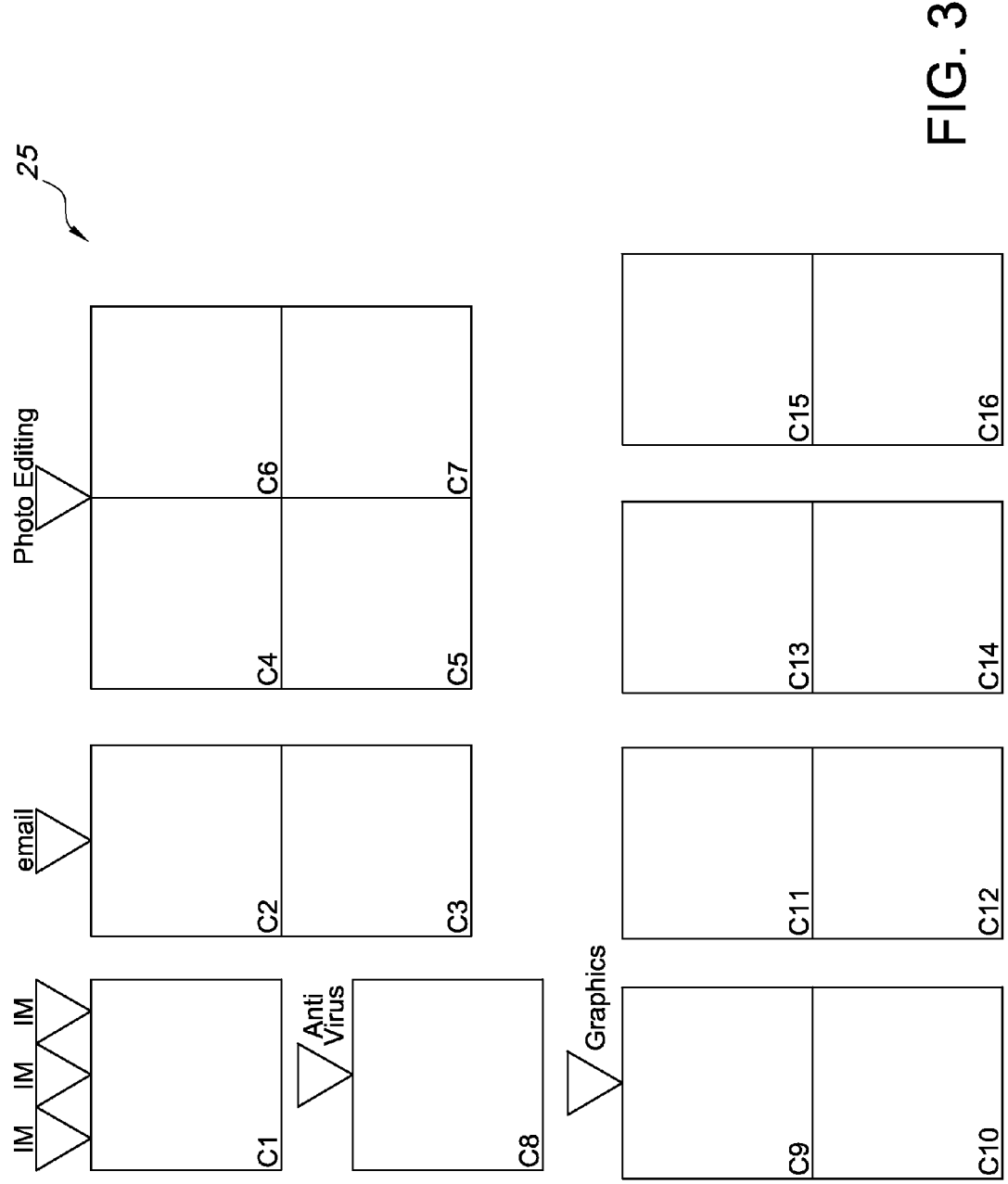

ENVIRONMENT MANAGERS VIA VIRTUAL MACHINES

FIELD OF THE INVENTION

Generally, the present invention relates to computing system environments contemplative of virtual machines assembled to achieve common computing goals, such as providing various computing applications to users in an entity, e.g., email, photo-editing, word processing, internet messaging, etc. Particularly, it relates to managing the virtual machines to enforce computing policies of an enterprise in a distributed manner to minimize or eliminate idiosyncratic services to a user's individual computing device. Various features contemplate libraries, managers, computing policies, threat assessment, auditing, and software program products, to name a few.

BACKGROUND OF THE INVENTION

Enterprises today manage their user environments by deploying services directly to individual users' machines, such as anti-virus, spyware scanning, and other enterprise approved applications and/or services (e.g., approved e-mail, approved graphics editor, approved Internet messaging, etc.). The practice, however, is growing more difficult to manage as multi-core computing environments reach the desktop.

For example, dual-core and recent quad-core systems in a single computing device involve parallel programming which, to date, has been known to cause problems. That is, separate tasks have regularly needed shared memory caches for accessing data. When one task is accessing memory, and the other needs access to the same memory, a system crash can occur if proper safeguards are not put in place. While this is but one problem, it typifies the nature of parallel programming. Consider further that this problem compounds itself as cores increase in size from two and four to eight, sixteen, thirty-two or more. Imagine further the problem of complication as enterprise's have dozens, hundreds or thousands of employees, each with a dedicated computing device having multiple cores or multiple devices acting together for a common purpose, with or without multiple cores. Regulatory pressures will also mount as new products and programming techniques emerge.

As another example, future multi-core processing environments might find individual services being taken care of by virtual machines rather than monolithic operating systems. For instance, today it is very common to run a single operating system on a user's computing device (such as Linux or Windows brand operating systems) and to run all other applications in that environment. In the future, operating environments will be specific to the service rather than the computing device and the services will be operating as virtual machines on the multi-core computing environment.

Today's art also includes the running of a base operating system on a user's computing device and then a virtual machine on that base's operating system (e.g., Windows runs VMware on Linux). However, this does not mitigate issues because, in this case, an anti-virus scanning service must be running on both Linux and on the Windows virtual machine in order to mitigate virus threats.

With reference to FIG. 3, a computing environment 25 shows sixteen processing cores (C1-C16), and a computing scenario where: Internet Messaging (IM) is serviced by a single core C1; e-mail is serviced by two cores C2 and C3; Photo Editing is serviced by four cores C4-C7; Anti-Virus scanning for real-time virus protection is serviced by one core C8, Graphics editing is serviced by two cores C9 and C10; and the remaining cores C11-C16 are available for other services/applications/etc. Considering the further scenario where the operating environment for IM is Linux-based, while the operating environment for Photo Editing is Windows-based, it can be seen that a single user's computing device with sixteen cores will not run a single operating environment, but a hypervisor-type virtual environment management mechanism. In turn, this makes demands of the Anti-Virus real-time scanning module quite high because the module must understand the operational characteristics of, not one, but many computing environments.

Accordingly, a need exists in the art of user computing environments to better program to multiple cores. The need further contemplates a paradigm of assemblies of computing devices acting collectively as a multiple core, with or without each having multiple cores. In turn, the paradigm needs robustness to deploy individual services to the users, but in a way that supports a plethora of computing environments without unduly complicating the environment. As with many modern paradigms, such should also embrace governance scenarios and user identity awareness, while simultaneously enabling flexibility, integration with multiple applications and evolving technologies. Naturally, any improvements along such lines should further contemplate good engineering practices, such as relative inexpensiveness, stability, ease of implementation, low complexity, security, unobtrusiveness, etc.

SUMMARY OF THE INVENTION

The above-mentioned and other problems become solved by applying the principles and teachings associated with the hereinafter-described environment mangers via virtual machines. At a high level, methods and apparatus are used to enforce computing policies of an enterprise in a distributed manner so that individual services to a user's computing device can be minimized or altogether eliminated. Also, the computing environment provides a configuration for management rules, audit management and deployment according to enterprise rules and policies in a virtualized environment without deployment of individual services to the user's computing device, and in a way that supports a plethora of computing platforms.

In a representative embodiment, a plurality of virtual machines are arranged on one or more computing devices, and define applications specified by a user and shared services approved by an enterprise. A central library stores the virtual machines and each is available for check-out by users. A first manager evaluates the virtual machines for satisfactory compliance with enterprise computing policies at a time when the virtual machines are resident in the library. Upon confirmation of satisfactory compliance, a second manager facilitates deployment of the applications and the shared services to users. In the event of non-compliance, servicing and testing of the virtual machines are implemented and occurs while the machines are resident in the library.

Libraries, managers, threat assessments, auditing, software program products, and policy management are some other features, to name a few. Still other embodiments contemplate computer program products with executable instructions, available as a download or on a computer-readable media, for implementing some or all of the foregoing on one or more physical computing devices.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 3 is a diagrammatic view of a multi-core computing assembly.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for environment mangers via virtual machines are hereinafter described.

Figure 1:
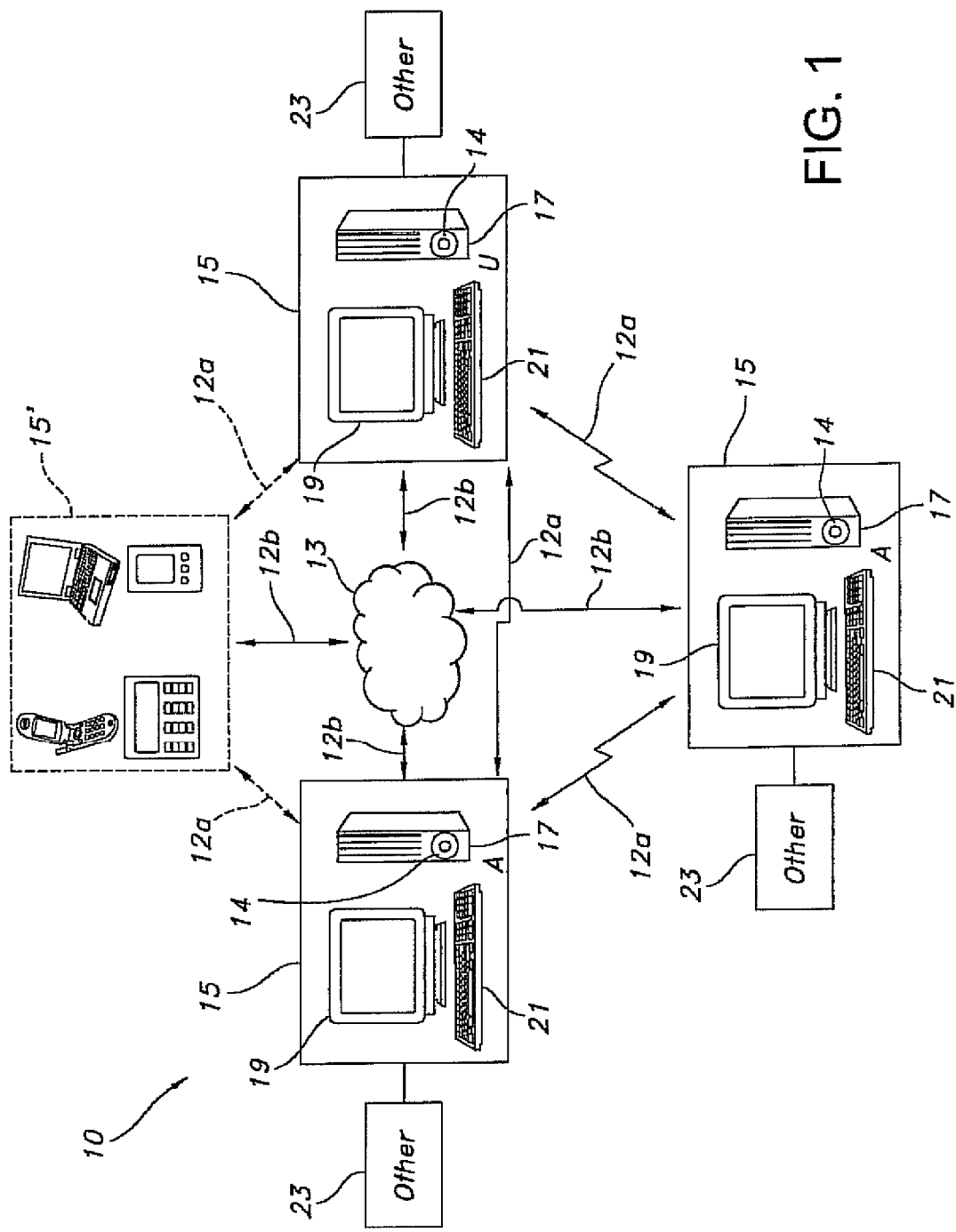
FIG. 1 is a diagrammatic view in accordance with the present invention of representative physical devices in a computing system environment for environment management via virtual machines.

With reference to FIG. 1, a representative environment 10 of physical computing devices 15 or 15' exists per an enterprise and such is provided as workstation(s) per individual users, workgroups, teams, departments, management, branches, divisions, etc. They are arranged as individual or networked physical or virtual machines, including clients or hosts arranged with a variety of other networks and computing devices, but their physical arrangement or type is largely irrelevant to the invention. That is, one or more physical computing devices include one or more computing cores, or collectively work as one or more computing cores to achieve common computing goals as virtual machines, but such occurs irrespective of their layout, type or usage of the physical computing devices. In terms of hardware, an exemplary physical computing device typifies a server 17, such as a grid or blade server, or peer-to-peer arrangement, hosting applications, web functions, communications, files, etc. Alternatively, an exemplary computing device includes a general or special purpose computing device, e.g., workstation, in the form of a conventional fixed or mobile computer 17 having an attendant monitor 19 and user interface 21. The computer internally includes a controller or processing unit for a resident operating system, such as DOS, WINDOWS, MACINTOSH, VISTA, UNIX and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a server (web, application, communication, IMAP, POP, file, etc.), an AJAX client, a grid-computing node, a peer, a virtual machine, a web service endpoint, a cellular phone, or the like. The other items may also be stand alone computing devices 15' in the environment 10.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., code or software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
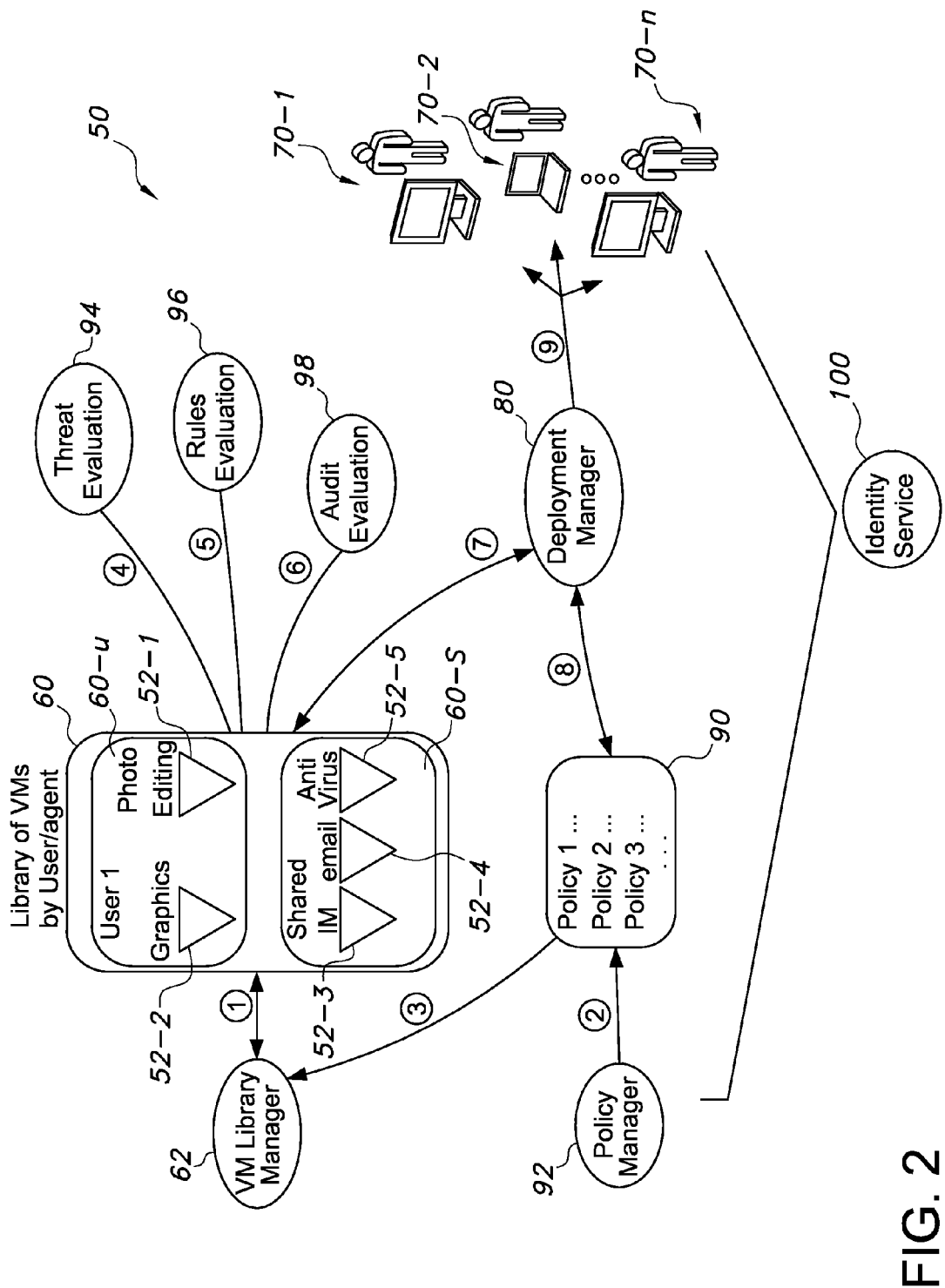
FIG. 2 is a combined diagrammatic view and flow chart in accordance with the present invention for environment management via virtual machines.

With the foregoing representative computing environment as backdrop, FIG. 2 begins the illustration 50 of environment managers via virtual machines. As a matter of convention beforehand, however, a symbol or diagram in the form of an inverted triangle (i.e. 52) represents a single virtual machine. The machine may exist, such as in FIG. 1, on or in one or more cores of the workstation of the user, collectively on or in one or more computing devices or configurations, having one or more cores, or in any of the foregoing. Also, the functionality of each individual virtual machine may be any application, shared service of the enterprise, or other known or later invented useful computing applications) for users.

Representatively, the virtual machines described include a Photo-Editing module 52-1, a Graphics module 52-2, an Instant Messaging (IM) module 52-3, an e-mail module 52-4 and an Anti-Virus module 52-5. (Of course, it is well known how a virtual machine can be configured and associated with virtual disks and content in the virtual disk and physical disks and content in the physical disk, and are not described further herein in detail. Also, computing particulars per each virtual machine will likely contemplate disk and memory usage/amount/location/etc., the existence/configuration of a firewall, relationships to other virtual machines or physical computing devices; external connectivity, etc.) They are either defined or configured by a virtual machine (VM) library manager 62 at step 1 or harvested from the user's workstation environment 70-1, 70-2, . . . 70-*n* by way of a deployment manager 80 at steps 7 and 9.

Regardless, once obtained, each virtual machine 52 is compiled with other virtual machines in a library 60, such that the applications and the shared services are available for utilization by the user upon deployment from the library, by way of steps 7 and 9 and the Deployment Manager. The library includes both those virtual machines specified by a user 60-U and shared services approved by the enterprise 60-S. In this example, the Graphics and Photo-Editing modules are user specified, while the IM, e-mail and Anti-Virus modules are computing services shared by the many users of the enterprise, and approved by the enterprise. Naturally, many other virtual machines will exist in the library and can be used for a myriad of user applications. Also, there may be other library sections, other than user (U) and shared (S), according to need. It is also well to note that the definitions for the virtual machines while in the library can be described via XML or some other descriptive language. Over time, the virtual machines existing in the library may come and go, or be updated/re-arranged according to need. Further, it may be the situation that only a single application, e.g., Photo-editing 52-1, will be run within a single virtual machine (as a minimalist approach to increase the security level of the virtual machine environment because only services specific to the single application are loaded, thus reducing the attack surface), but in other embodiments, there could be several applications running per each virtual machine.

At reference numeral 90, the enterprise will have long and short term, established and flexible policies 90 relevant to the virtual machines. In this regard, a Policy Manager 92 defines the policies in computing terms to govern the use of the virtual machines on the user's computing device via step 2. As an example, it may be an enterprise computing policy that the email shared service module 52-4 include a latest browser version, such as Mozilla brand Firefox browser version 2.0.0.8. However, instead of needing to update each browser version per an individual's computing device in the enterprise, one-by-one with a system administrator or other IT professional working directly on the user's workstation, the VM Library Manager 62 accesses the policy 90 (via step 3) and enforces the policy one-time on the virtual machine (via step 1) while the virtual machine is resident in the library 60 of virtual machines. The enforcement consists of the email module 52-4 being updated with the latest browser version 2.0.0.8 that users can later check-out, but only a single instance of updating need occur in the library instead of multiple instances of updating per each user's individual computing device. In turn, enterprise resources (e.g., time, effort, money, etc.) are saved.

The Deployment Manager deploys virtual machines from the library (via step 7) as needed to users' workstation environments 70 (via step 9) but, before doing so, it independently confirms or ensures satisfactory compliance with the enterprise policies 90 (e.g., the latest browser version 2.0.0.8 for email module 52-4) via step 8. In this manner, computing policies of the enterprise are enforced in a distributed manner so that idiosyncratic services to a user's computing device can be minimized or altogether eliminated. On the other hand, if non-compliance with policy is found, the VM Library Manager is so notified to service (and or test) the virtual machines 52 while resident in the library.

In another embodiment, the virtual machines 52 resident in the library 60 may be also interrogated via steps 4, 5 and 6 to mitigate any threats, apply enterprise rules, and perform audits as needed by the enterprise. This consists of modules 94, 96 and 98 either interrogating the virtual machines 52 directly or the modules instantiate the virtual machines and cause their appropriate operating environment to run the services necessary to perform the interrogation function, make changes to the virtual machine, and then re-store it in the library 60.

As an example, enterprises regularly monitor feeds by subscribing to an alert service (such as RSS feeds) to ascertain virus threats or obtain the latest computing patches for particular applications. Upon a new threat being learned or a new patch being released, the threat evaluation module 94 can interrogate the application embodied in the virtual machine to see if it is current, or needs updating. If current, satisfactory compliance of the computing policy is simply confirmed and the virtual machines are available for immediate deployment. If needing updating, the VM library manager via 1 is notified to make the necessary servicing of the virtual machines while they are resident in the library, which results in a single instance of updating such that idiosyncratic services to a user's computing device is minimized or altogether eliminated.

Similarly, the rules evaluation module 96 can be used to conduct enterprise rule or industry specific interrogations of the virtual machines. In this regard, it is also contemplated that various "what-if" scenarios can be conducted on the virtual machines, such that if servicing of a virtual machine were to occur, what would its resultant effect be. In other words, the module is able to conduct a testing function to see if application of a rule, for instance, would result in an effective deployment to the users at 70, without actually deploying it until a time when already proven effective. The auditing module is still another module available to assess satisfactory compliance.

In other embodiments, an identity service 100 underlies the environment management so that identities of users, managers, policies, etc., are known definitively in the environment. To the extent identities are unknown, it can cause reflexive functions to prohibit computing services, run audits, shut-down applications, contact security, or the like. It can be also used in defining the resolution of the policies.

Appreciating that enterprises can implement procedures with humans as well as computing devices, skilled artisans will understand that the described managers 62, 80, 92 can be people, such as system administrators, as well as executable code, or combinations of each. It is also contemplated that implementations consist of defining all managers as one single entity, as the three managers shown in the figure, or in different combinations.

Certain advantages over the prior art should be readily apparent. For example, the invention provides various computing applications to users in an entity, e.g., email, photo-editing, word processing, etc., particularly according to a distributed manner using virtual machines so that individual services do not have to be deployed to the users singularly. This is especially useful when physical computing devices have many cores and are running many virtual environments. Various other advantages contemplate: providing a solution for managing the user's environment by inspecting, installing, and configuring virtual machines; specifying policy that governance the mitigation of threat, the application of rules, and performing audits concerning the enterprise's approved services and mechanisms on the user's environment; providing a solution for maintaining multiple user environments from a central location; and providing a solution for maintaining shared services via virtual machines according to enterprise policy, to name a few. Libraries, managers, software program products, policy enforcement and corporate governance, are other noteworthy features.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures or expanding the system to replicate the embodiments multiple times.

The invention claimed is:

1. In a computing system environment having pluralities of computing devices, a method of enforcing enterprise computing governance policies in a distributed manner using virtual machines arranged on one or more of the computing devices, comprising:
    establishing a library of virtual machines including applications and shared services, the applications and the shared services to be utilized by way of a computing device upon deployment from the library;
    defining the enterprise computing governance policies applicable to the virtual machines;
    evaluating satisfactory compliance with the enterprise computing governance policies by the virtual machines while resident in the library of virtual machines; and
    deploying the applications and the shared services to the computing device upon request, but only upon confirming the satisfactory compliance.

2. The method of claim 1, further including evaluating threats and rules applicable to the virtual machines while resident in the library of virtual machines.

3. The method of claim 1, wherein the establishing the library of virtual machines further includes storing the applications and the shared services.

4. The method of claim 2, wherein the evaluating satisfactory compliance further includes auditing the evaluated threats and rules for the satisfactory compliance.

5. The method of claim 1, wherein the deploying further includes making executable code available to the computing device to execute the applications and the shared service.

6. The method of claim 1, further including servicing the virtual machines resident in the library of virtual machines in the event of non-compliance during the evaluating.

7. The method of claim 6, further including testing the virtual machines resident in the library of virtual machines after the servicing to further evaluate satisfactory compliance.

8. The method of claim 1, wherein the evaluating satisfactory compliance further includes inspecting the applications and the shared services for relevant computing patches.

9. The method of claim 1, further including subscribing to an alert service for undertaking the evaluating satisfactory compliance.

10. The method of claim 1, further including providing an identity service for identifying users of the virtual machines.

11. In a computing system environment having pluralities of computing devices, a method of enforcing enterprise computing governance policies in a distributed manner using virtual machines arranged on one or more of the computing devices, comprising:
    establishing a library of virtual machines including applications and shared services, the applications and the shared services to be utilized by way of a computing device upon deployment from the library;
    defining the enterprise computing governance policies applicable to the virtual machines;
    evaluating satisfactory compliance with the enterprise computing governance policies by the virtual machines while resident in the library of virtual machines, the evaluating including evaluating virus threats to the applications and the shared services and determining whether the applications and the shared services comply with the computing policies;
    deploying the applications and the shared services to the computing device upon request, but only upon confirming the satisfactory compliance; and
    servicing the virtual machines resident in the library of virtual machines in the event of non-compliance during the evaluating.

12. The method of claim 11, wherein the evaluating satisfactory compliance further includes inspecting the applications and the shared services for relevant computing patches.

13. The method of claim 12, further including subscribing to an alert service for undertaking the evaluating satisfactory compliance.

14. The method of claim 11, further including testing the virtual machines resident in the library of virtual machines after the servicing to further evaluate satisfactory compliance.

15. A computing system to enforce computing policies in a distributed manner so that services to a computing device can be minimized or eliminated, comprising:
    a plurality of computing devices arranged locally and/or remotely, including a workstation arranged as the computing device;
    a plurality of virtual machines arranged on one or more of the computing devices, the virtual machines defining applications and shared services;
    a library storing the virtual machines to be utilized by way of the computing device upon deployment from the library;
    one or more enterprise computing governance policies applicable to the virtual machines;
    a first manager to evaluate satisfactory compliance of the enterprise computing governance policies by the virtual machines while resident in the library; and
    a second manager the same or different as the first manager to deploy the applications and the shared services to the computing device upon request, but only upon independent confirmation of the satisfactory compliance while the virtual machines are resident in the library.

16. The computing system of claim 15, further including a computing subscription to an alert service regarding threats to the applications and the shared services.

17. The computing system of claim 15, further including a controller of at least one of the computing devices configured to service the virtual machines resident in the library in the event of non-compliance to the computing policy.

18. The computing system of claim 17, wherein the controller is further configured to test the virtual machines resident in the library after the servicing to further evaluate satisfactory compliance.

19. A computer program product available as a download available from a remote computing device or on a non-transitory computer readable storage medium having executable instructions for installation on one or more computing devices in a computing environment for enforcing computing policies in a distributed manner so that individual services to an individual computing device can be minimized or eliminated, the one or more computing devices including a plurality of virtual machines defining applications and shared services, comprising:
- a first component configured for receipt of an enterprise computing governance policy applicable to the virtual machines resident in a library of virtual machines;
- a second component configured to evaluate satisfactory compliance of the enterprise computing governance policy by the virtual machines while resident in the library; and
- a third component configured to deploy the applications and the shared services to the individual computing device upon request, but only upon independent confirmation of the satisfactory compliance by the second component.

20. The computer program product of claim 19, further including a fourth component configured to service the virtual machines resident in the library in the event of non-compliance to the computing policy.

21. The computer program product of claim 20, further including a fifth component to test the virtual machines resident in the library after the servicing.

* * * * *